United States Patent [19]

Heffner et al.

[11] Patent Number: 4,735,476
[45] Date of Patent: Apr. 5, 1988

[54] ACOUSTO-OPTIC BRAGG CELL

[75] Inventors: Brian L. Heffner, Menlo Park; Gordon S. Kino, Stanford; William P. Risk, III; Butrus Khuri-Yakub, both of Palo Alto, all of Calif.

[73] Assignee: Board of Trustees of the Leland Stanford Junior University, Stanford, Calif.

[21] Appl. No.: 777,205

[22] Filed: Sep. 18, 1985

[51] Int. Cl.⁴ .............................................. G02B 6/10
[52] U.S. Cl. .................................................. 350/96.13
[58] Field of Search .............. 350/96.13, 96.14, 96.17, 350/96.3; 356/314

[56] References Cited

U.S. PATENT DOCUMENTS

| | | | |
|---|---|---|---|
| 3,625,589 | 8/1969 | Snitzer | 350/96.13 |
| 3,645,603 | 2/1972 | Smith | 350/96.13 |
| 3,850,503 | 11/1974 | Riseberg et al. | 350/96.13 |
| 3,856,378 | 12/1974 | Brandt et al. | 350/96.13 |
| 3,916,348 | 10/1975 | Toda et al. | 350/96.13 X |
| 3,931,518 | 1/1976 | Miller | 250/227 |
| 4,067,643 | 1/1978 | Sugimura et al. | 350/96.13 |
| 4,086,484 | 4/1978 | Steensma | 250/199 |
| 4,268,116 | 5/1981 | Schmadel et al. | 350/96.29 |
| 4,312,562 | 1/1982 | Segawa et al. | 350/96.15 |

FOREIGN PATENT DOCUMENTS 57-58616  9/1982  Japan .

OTHER PUBLICATIONS

F. Gfeller, "Electroacoustic Transducer for Optical Fiber Modulator and Tap," *IBM Technical Disclosure Bulletin*, vol. 21 No. 2, (Jul., 1978).
F. Gfeller and H. R. Mueller, "Modulator and Tap for Optical Fiber Systems," *IBM Technical Disclosure Bulletin*, vol. 21, No. 5, (Oct., 1978).

Primary Examiner—Eugene R. LaRoche
Assistant Examiner—Steven J. Mottola
Attorney, Agent, or Firm—Knobbe, Martens, Olson & Bear

[57] ABSTRACT

A Bragg cell device for use as a tap in optical systems. In one embodiment an acoustic transducer is secured to a surface of an acoustic transmission medium, which is adjustably secured in hertzian contact with a surface of a waveguide. Bulk acoustic waves at frequencies above about 1 GHz are transmitted from the transducer through the transmission medium into the waveguide along a propagation path wherein the acoustic wavefronts intersect a light path in the waveguide at an angle which satisfies Bragg conditions, producing deflection of light out of the light path. Preferably, the transmission medium is also an optical conductor and is oriented upon the waveguide to receive the deflected light and transmit it to a polished optical window on the transmission medium. A grating transducer is secured on the transmission medium to detect acoustic signals reflected in the transmission medium. During position adjustment of the transmission medium and the waveguide, proper positioning is confirmed by a detected decrease in reflected acoustic signals, indicating the signals are entering the waveguide. In another embodiment, a grating transducer is deposited directly on a surface of a waveguide in a configuration to launch acoustic waves into the waveguide at an angle necessary to produce deflection of light from optical paths in the waveguide. When the waveguide comprises an optical fiber, the grating transducer conforms to the curvature of the fiber surface, thereby focusing acoustic signals from the transducer onto the fiber core.

35 Claims, 3 Drawing Sheets

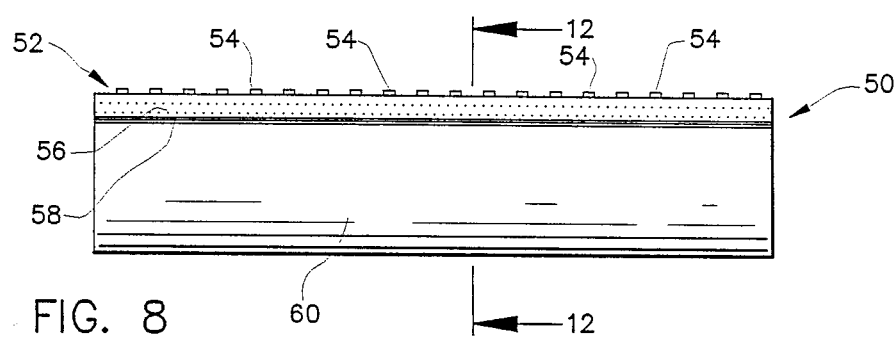
FIG. 8
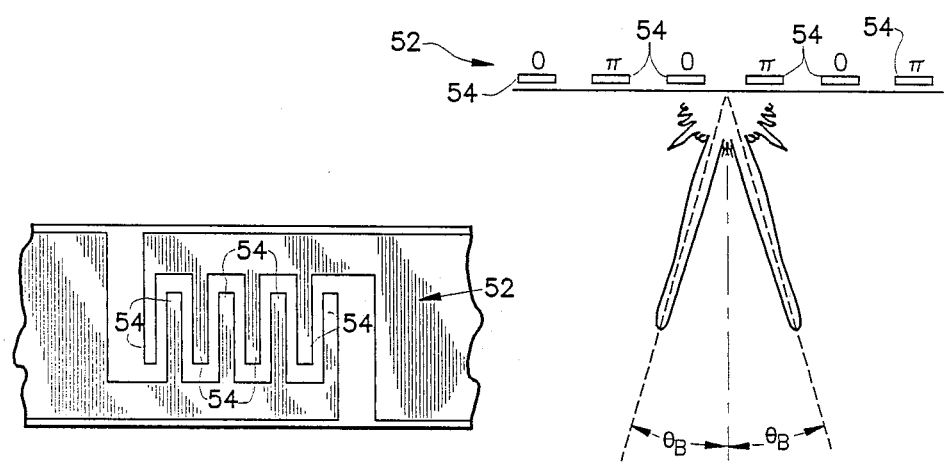
FIG. 9
FIG. 10
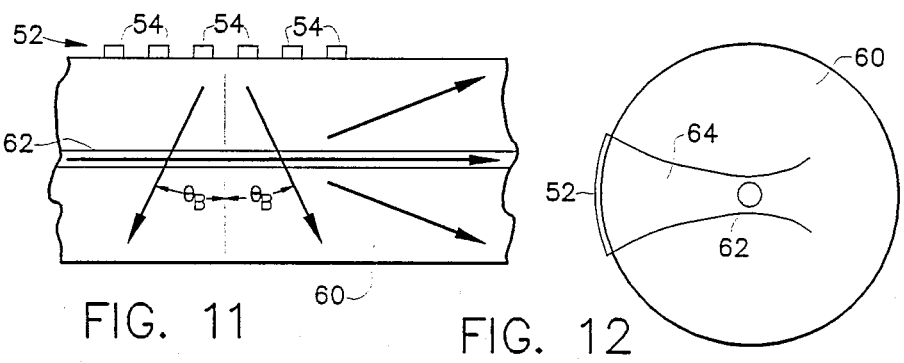
FIG. 11
FIG. 12

ACOUSTO-OPTIC BRAGG CELL

The U.S. Government has rights in this invention pursuant to Office of Naval Research Contract No. N00014-84-K-0327.

BACKGROUND OF THE INVENTION

1. Field of the Invention

The present invention relates to Bragg cells for deflecting optical beams at extremely high frequencies, and particularly to Bragg cells which may be used as optical taps in fiber-optical systems.

2. The Prior Art

Bragg cells are well-known for use in deflecting optical beams by interaction of the beams with acoustic waves. Conventional Bragg cells make use of a wide optical beam whose width encompasses many optical wavelengths, and which interacts with an acoustic wave traveling in a solid or liquid medium. An optical beam encountering the acoustic wave at an angle which falls within a given range will be diffracted at an angle which is a function of the acoustic wavelength and the optical wavelength. Typically, these Bragg cells are used as UHF frequencies in the range of about 10 MHz to 2 GHz, with the deflection angle of the light being very small. It is very difficult to make such a device for use at extremely high frequency ranges on the order of several GHz and with larger deflection angles, because of acoustic losses experienced at those frequencies in the solid or liquid medium.

In conventional Bragg cells, the angle of deflection of optical beams varies almost linearly with the frequency of the acoustic wave. This implies that the light pattern formed by the deflected beam is the Fourier transform of the acoustic beam modulation. The availability of this type of interaction opens up a wide range of signal processing applications for these devices. Further, if an optical lens is utilized to perform Fourier transforms, or if interactions with two acoustic beams are utilized, further possibilities for signal processing with acoustic waves in an acousto-optic system are opened up, including applications to real-time wide-band convolution and correlation of electrical signals. However, because of the frequency restriction experienced by these devices, they have not been available for many high-speed uses, such as communications applications and high-speed switching of optical signals in fiber-optic systems. Nevertheless, the use of wide optical beams in these devices precludes their use in many optical systems, such as those utilizing optical fibers as waveguides for carrying narrow band optical signals. One particular application for a Bragg cell having the capability to deflect light at larger angles and at much higher frequencies than conventional Braggs cells, would be its use for tapping optical fibers and optical waveguides.

In many systems involving optical waveguides and optical fibers, it is necessary for system operation to tap light from the fiber or waveguide. Applications for such systems include, among many others, tapping of the light for signal processing purposes such as multiplexing or data distribution, tapping of the light for filtering purposes, and tapping for purposes of monitoring system operation. Many devices and processes are presently utilized for tapping light from optical waveguides as well as for injecting light into the optical waveguides.

One conventional method for tapping light from such a system involves use of optical couplers which are constructed to hold optical fibers in parallel proximity, forming an interaction region between the parallel fibers in which optical signals may be coupled from one fiber to the other. Use of these types of couplers requires careful alignment of the adjacent fibers, and may also require a lapping or other process for removing cladding from around the core portions of each fiber so that the cores may be placed in closer proximity to one another. The amount of light which is tapped from the waveguide is directly related to the relative position of the adjacent fibers. Thus, to change the amount of light coupled from a particular fiber, careful and often difficult and time consuming adjustment of the relative positions of the adjacent fibers in the coupler is necessary. This type of coupling arrangement does ot lend itself to applications where rapid on and off switching is necessary or where changes in amount of light tapped from a waveguide is required.

Another means for tapping light from optical waveguides such as optical fibers involves bending the waveguide at the tap location by an amount sufficient to cause a portion of the light traveling in the waveguide to be emitted from the core as it passes through the bend. This method permits adjustment of the amount of light tapped from the waveguide by adjusting the amount of bend in the waveguide. As the amount of bend increases over a small area, more light will be emitted, and vice-versa. However, like the lapped-fiber configuration described previously, this method does not lend itself for use in providing rapid on and off switching or changes in the amount of light tapped from the waveguide. In fact, such rapid physical adjustment of the bend to accomplish these purposes would not be possible with present fiber handling technology. Further, making changes in the bending radius is an undesirable way of accomplishing switching functions, since the continued adjustment of the bending radius causes fatigue in the waveguide, thereby significantly reducing the operating life of that waveguide.

Another device for tapping light from optical waveguides utilizes an acoustic transducer for sending an acoustic signal through a quartz block at an angle with respect to an optical fiber embraced by the quartz block. The gap between the quartz block and the optical fiber is filled with a liquid to obtain acoustic impedance matching. Light in the fiber is reflected out of the fiber under Bragg's condition through another block positioned below the fiber. This system avoids much physical damage to the fiber, but the use of the block and index matching fluid produce attenuation of the acoustic signal, limiting the acoustic signal frequency which can be used. Further, since the acoustic signal must intersect the small fiber, proper alignment of the acoustic transducer and the optical fiber through the block is critical. However, since the transducer is fixed onto the block which is fixed relative to the fiber, alignment of the device is very difficult during assembly, and changing the alignment after assembly is virtually impossible. In addition, the use of liquid to interface the block with the fiber further complicates the system, as well as its assembly. Thus, like the devices discussed above, this system is limited in the acoustic frequency which can be used, as well as in the assembly and operation of this complex system.

Based on the above, it would be an important improvement in the art to provide a Bragg cell which could be utilized at frequencies which are much higher than conventional Bragg cells, and which would utilize acoustic signals at those frequencies for deflecting light beams in optical waveguides at a relatively large angle with respect to the direction of travel of the original beam. It would be a further improvement in the art to provide such a Bragg cell which could be used for tapping light from optical waveguides, including optical fibers, so that light traveling in the optical fiber could be interrogated, and so that the amount of light going into or out of the waveguide could be controlled and rapidly changed with the assistance of a high-speed external electronic signal. It would be an even further improvement in the art to provide such a device for tapping optical waveguides which provides a solid acoustic path which is liquid-free and which may be initially installed and adjusted, with no further adjustment required in accomplishing the above-described tapping and switching functions. Such a device preferably would operate at acoustic frequencies above approximately 1 GHz and would utilize bulk acoustic waves. It would be a still further improvement in the art to provide an acousto-optic Bragg cell for applying an acoustic signal to an optical signal traveling in a waveguide, with the Bragg cell including means for detecting when the source of the acoustic signal is in position to communicate the acoustic signal into the waveguide at an appropriate angle. It would be an even further improvement in the art to provide an acousto-optic Bragg cell having the source of acoustic signals positioned directly upon a waveguide so that acoustic signals may be applied directly into the waveguide to interact with optical signals traveling therein.

BRIEF SUMMARY OF THE INVENTION

The present invention comprises a Bragg cell and method of its construction, wherein an acoustic wave having a frequency in the range of above approximately 1 GHz is applied to a waveguide at an angle such that light traveling within the waveguide is diffracted therefrom upon encountering the acoustic wave. In one preferred embodiment, a zinc oxide bulk wave transducer is deposited on one face of a wedge of yttrium aluminum garnet (YAG). A second face of the wedge has an arcuate surface, preferably spherical in configuration, so that when such surface is placed against a planar surface, only a selected region of that arcuate wedge surface contacts the adjacent planar surface at a given time. The spherical face of the wedge is pressed against the flat side of an optical waveguide, such as a D-shaped optical fiber, to form a hertzian contact. This contact makes it possible to launch acoustic waves into the fiber at a selected angle.

Alignment between the fiber and the YAG wedge is necessary so that the narrow acoustic beam will intercept the optical fiber core at a particular angle which is selected to cause Bragg scattering of light in the optical fiber core. To accomplish this alignment, a bulk wave receiving transducer configured in the shape of a grating is deposited on the same face of the wedge as the bulk wave sending transducer, and is positioned near that transducer. The grating configuration permits the bulk wave grating transducer to monitor acoustic beams arriving on that transducer along a path which is at a selected angle with respect to the plane of the transducer. Thus, at least a portion of an acoustic wave transmitted through the wedge from the sending transducer and reflected from the lower surface of the wedge of a selected angle is received by the grating transducer. Adjusting the alignment of the wedge on the waveguide surface while sending and detecting acoustic signals in the wedge will produce a reduction in the reflected power, observed by the receiving transducer when the wedge is in certain positions. This reduction in reflected acoustic signals indicates that the appropriate alignment angle has been obtained, and that the acoustic signal is being transmitted through the hertzian contact region and into the waveguide.

The bulk waves which travel through the contact region and into the fiber encounter and deflect light from the waveguide by means of Bragg scattering, thereby forming an optical tap. In the preferred embodiment, the structural relationship between the YAG crystal and the fiber is arranged so that the light tapped from the waveguide is received within the YAG crystal through which it propagates to a polished optical window positioned on a surface of the wedge. From the optical window, the light may be communicated to other monitoring or processing equipment as the application dictates.

In another preferred embodiment, a grating transducer is deposited directly on the surface of the waveguide, permitting acoustic waves to be launched into the waveguide at the angles necessary to cause diffraction of light traveling within the waveguide. The angle of the acoustic wave propagation path with resepct to the path of light traveling in the waveguide is determined by the spacing between the grating elements or fingers and by the frequency of the acoustic wave. Thus, control of the acoustic progation angle in this embodiment does not require tilting or other adjustment of the transducer on the waveguide surface.

By properly choosing the spacing between grating elements or fingers, a desired acoustic propagation angle may be obtained for achieving Bragg scattering and causing deflection of the signals within the waveguide. No mechanical alignment of the system is necessary. Furthermore, this technique can be used with a standard cylindrical optical fiber. When the waveguide comprises an optical fiber, the curve of the surface of the fiber causes the acoustic transducers deposited thereon to focus the acoustic signal from the transducer onto the core of the fiber. By focusing the acoustic signal in this manner, the efficiency of the optical tap is greatly increased.

When a fiber is used as the optical waveguide, the grating transducer is formed on the surface of the waveguide by a special process. Specifically, small stainless steel bars comprises carriers which support the optical fiber waveguides through the fabrication process. Each carrier is bowed so that its upper surface is rounded to a cylinder radius of approximately 30 centimeters, and is polished smooth. The cylinder axis is perpendicular to the longitudinal axis of the carrier. Small spring clamps at each end of the carrier hold ends of the fiber so that the fiber extends parallel to the longitudinal axis of the carrier and is secured against the upper rounded surface of the carrier. The carriers are clamped into a thermal mount in an RF sputtering station, and the stiffness of the fibers keep the fibers pressed against the steel carriers, keeping the fibers at the temperature necessary for sputtering thin films.

The transducer array is defined photolithographically using a projection system whose aperture is reduced to allow a large depth of focus which is needed to expose the side of the cylindrical fiber. Photoresist is spun directly onto the carriers so that the orientation of the fibers will not change between the process steps.

These and other advantages and features of the present invention will become more fully apparent from the following description and appended claim taken in conjunction with the accompanying drawings.

BRIEF DESCRIPTION OF THE DRAWINGS

FIG. 8 is a side schematic view of another presently preferred embodiment of an acousto-optic fiber tap in accordance with the present invention.

FIG. 9 is a top view of the device of FIG. 8, illustrating one preferred embodiment of a configuration for the interdigital transducer that embodiment.

FIG. 10 is an illustration of the radiation pattern of the interdigital transducer of FIG. 8.

FIG. 11 is a representation of the optical signal diffraction pattern resulting from the acoustic radiation pattern illustrated in FIG. 10 as applied into the acousto-optic fiber tap of FIG. 8.

FIG. 12 is a sectional view taken along lines 12—12 of FIG. 8, and illustrating the focusing of acoustic signals from the grating transducer onto the optical fiber core. This focusing results from the configuration of the sending transducers of the embodiment of FIG. 8.

DETAILED DESCRIPTION OF THE PREFERRED EMBODIMENT

The invention is best understood by reference to the figures wherein like parts are designated with like numerals throughout.

1. The YAG Wedge Tap.

Figure 1:
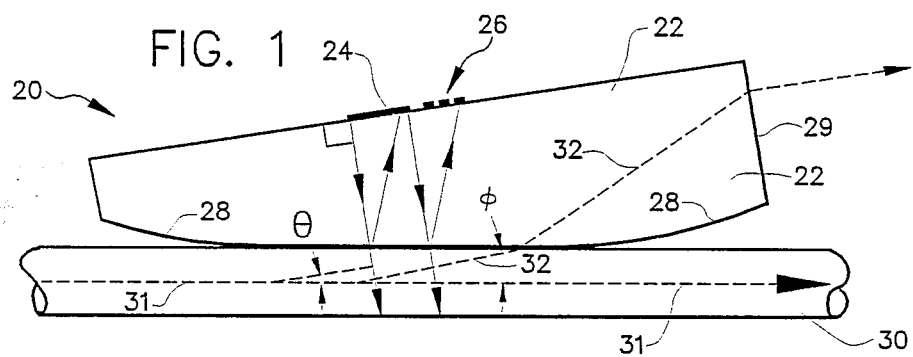
FIG. 1 is a schematic diagram of a presently preferred embodiment of the present invention illustrating operation with light flow in a first direction through the waveguide.

One presently preferred embodiment of the invention may be described by reference to FIG. 1. Specifically, FIG. 1 illustrates a Bragg cell 20 which is configured to function as an optical fiber tap. An optical fiber tap is a device which causes part of the light guided in a fiber core to be deflected out of the fiber so that it may be detected or otherwise used directly as an optical signal. In addition, this device may act as a means for injecting light onto an optical waveguide such as an optical fiber. The device of FIG. 1 may also be utilized to control the amount of light going into or out of the optical waveguide through use of an external high-speed electronic control signal, which varies the acoustic signal amplitude.

Bragg cell 20 is preferably comprised of a generally wedge-shaped block 22 of material having properties permitting the low loss through transmission of both light and acoustic waves. One material which is particularly suited for use in the wedge 22 is yttrium aluminum garnet (YAG), which permits through transmission of light as well as providing for transmission of acoustic signals with a low attenuation. Of course, there are numerous other materials of which wedge 22 can be constructed, including, but not limited to yttrium iron garnet (YIG) and sapphire.

Figure 2:
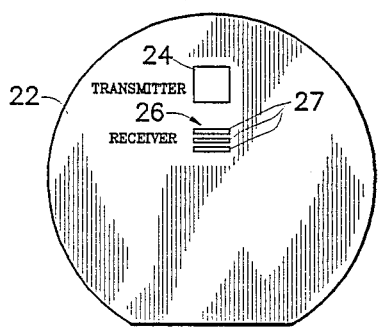
FIG. 2 is a top view of the YAG crystal utilized in the embodiment of the invention illustrated in FIG. 1.

A zinc oxide (ZnO) bulk wave input transducer 24 is deposited on an upper face of the wedge 22. Also deposited on the upper surface of wedge 22 is a zinc oxide bulk wave output transducer 26 configured in the shape of a grating. Optionally, the transducer 24 and 26 may comprise a body of lithium niobate ($LiNbO_3$), aluminum nitride (AlN), or other piezoelectric material. In operation, the piezoelectric material of transducers 24 and 26 is excited with a high frequency electronic voltage to generate an acoustic wave of a frequency greater than about 1 GHz. The configuration and relative positioning of transducers 24 and 26 on wedge 22 is illustrated in FIG. 2. Grating transducers are well-known in the industry for both receiving and transmitting signals traveling along paths which are angular in direction with respect to the plane of the grating.

Figure 3:
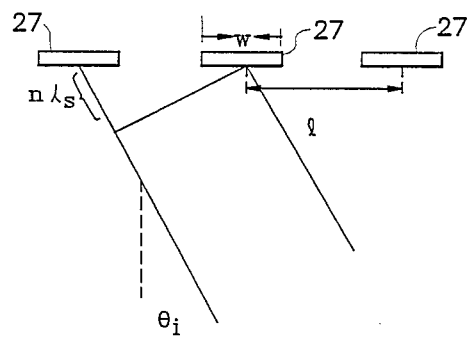
FIG. 3 is a side schematic illustration of a grating transducer of the type utilized in the present invention.
Figure 4:
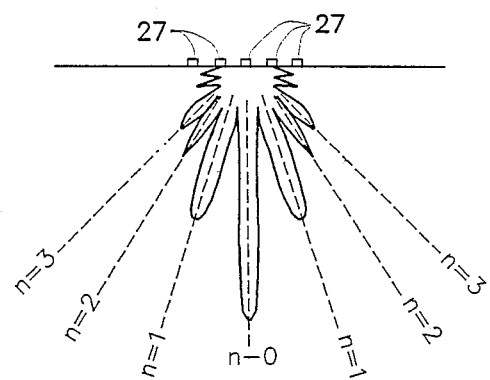
FIG. 4 is an illustration of the radiation pattern of a conventional grating transducer.

In the embodiment illustrating in FIG. 3, conductive metal strips 27 are laid down on piezoelectric material so that by applying a voltage through the metal strips to the piezoelectric material, an acoustic signal may be generated or received which has waveforms propagating along a path defining a selected angle between the wavefronts and the plane of the strips 27. In addition, there will be side lobes of the transmitting or received waves which have their maximum intensities at angles given by the relation:

$$\sin \theta_n = n\lambda \cdot l \qquad (1)$$

where $\lambda$ is the wavelength of the acoustic wave; l is the periodic spacing of the grating; n is an integer; and $\theta_n$ is the angle of the nth side lobe. An illustration of this type of radiation pattern is illustrated in FIG. 4. As a result of their configuration, and based on the spacing between the strips comprising the grating, the output transducer is also sensitive to waves which arrive at the output transducer 26 at the angle $\theta$. Thus, the transducer 26 may be utilized to detect acoustic signals arriving at selected angles. This feature is of importance in achieving proper alignment of the wedge 22 with other portions of the Bragg cell 20, as will be explained more fully hereafter.

The lower face 28 of wedge 22 comprises an arcuate surface, preferably spherical in configuration and is polished to permit the easy through passage of light. In one preferred embodiment, the spherical face 28 has a radius of curvature of approximately 2 meters. Wedge 22 additionally has a polished optical window 29 located opposite the thin angle of the wedge 22. Window 29 is also configured to allow the through passage of light.

In the illustrated embodiment, the lower face 28 of the wedge 22 is pressed against a flat side of a waveguide comprising an optical fiber 30 having a D-shaped cross-section to form a hertzian contact. The flat side may be formed in fiber 30 by any of the conventional optical fiber lapping procedures. Although it is contemplated that plural waveguides could be used in the present invention, the presently preferred embodiment comprises a waveguide configured as a single optical fiber. The spherical surface of wedge 22 allows the orientation of the transducer to be changed by tilting the fiber so that a different portion of the spherical surface contacts the flat side on the D-shaped fiber.

A hertzian contact results when any two rigid bodies are forced together into a "point" contact. The high stress in the neighborhood of this point causes elastic deformations, bringing the bodies into hard contact over a finite region. The resulting hard contact makes it possible to launch acoustic waves through an acoustic path formed entirely of solid material and into the fiber 30 through the finite region at the required angle.

With the Bragg cell 20 configured as illustrated, and with proper alignment between the wedge 22 and the fiber 30, an acoustic signal from transducer 24 may be transmitted into optical fiber 30, causing diffraction of light traveling along the path 31 through fiber 30, into the wedge 22 along the path illustrated at 32. This diffraction is produced as a result of a phenomenom known as Bragg scattering. Before the operation of the cell 20 is described in detail, the interaction of light with the acoustic wave resulting in the Bragg scattering condition will be discussed.

An acoustic wave propagating through a solid or liquid deflects a light beam in much the same manner as the diffraction grating described above. The sound wave creates a periodic variation of the permittivity of the medium in time and space. Because it travels through the medium with a finite velocity, rather than remaining stationary in space, the acoustic wave Doppler-shifts the frequency of the diffracted light beam as well as exciting it at an angle to the incident beam. By this means then, a light beam traveling along the path 31 through fiber 30 is deflected by an angle $\phi$ to travel the path illustrated at 32. The amplitude of the deflected beam depends on the amplitude of the acoustic wave, while the angle of deflection $\phi$ of the beam depends on the acoustic frequency or its wavelength. Thus, for example, if the acoustic wave frequency is $\omega_s$ and its propagation constant is $k_s = 2\pi/\lambda_s$ where $\lambda_s$ is the acoustic wavelength, it can be shown that the relation between input and output angles is $$k_1 1 - \cos \phi) = \pm k_s \sin \theta \qquad (2)$$

where $\omega_1$ is the input frequency of the light; and $k_1$ is the propagation constant of the light, and $\theta$ is the incident angle of the acoustic beam to a plane perpendicular to the longitudinal axis of the fiber.

In light of the above discussion, it will be appreciated that an acoustic signal transmitted from transducer 24 through wedge 22 into waveguide 30, along a propagation path which orients wavefronts of the acoustic signal is fiber 30 at the Bragg angle $\theta$ with respect to the optical transmission path 31, will causes diffraction of light at an angle $\phi$ from the path 31 along the path 32. In the illustrated embodiments, the wavefronts of the acoustic signals are oriented perpendicular to the direction of propagation of the acoustic signal. However, even in conditions wherein the wavefronts may not be perpendicular to the acoustic signal propagation path, the diffraction of light at the angle $\theta$ will be produced so long as the acoustic propagation path places the acoustic signal wavefronts in the fiber 30 so as to intersect propagation path 31 at an angle orientation of $\theta$ with respect to that optical signal propagation path.

Wedge 22 is aligned in hard contact with the fiber 30 not only to permit passage of the acoustic signal from transducer 24, but also to permit passage of diffracted light from fiber 30 into the wedge 22 so as to travel along path 32. Without this arrangement, light traveling along path 32 would encounter the edge of the fiber 30 and would be mostly reflected back into the fiber. An index matching medium of some type would be required to extract the light out of the side of the fiber 30. The necessity of providing a separate medium to extract the tapped light is avoided by utilizing the wedge 22 both as a transmission medium for the acoustic signal from transducer 24, and as a light transmission medium for allowing the tapped light to pass from the fiber along path 32. Thus, the light tapped from fiber 30 passes through the wedge 22 along path 32 to the polished optical window 29 where it is detected or used directly as an optical signal. It is noted that if light were injected into the system through window 29 and along path 32, with the same amplitude and frequency of acoustic wave being generated by transducer 24, the injected light would follow path 32 until encountering the acoustic signal, at which time the light would be deflected to travel to the left along path 31. Thus, the present invention makes it possible to both tap light from the waveguide and to conveniently inject light into the optical waveguide.

Figure 5:
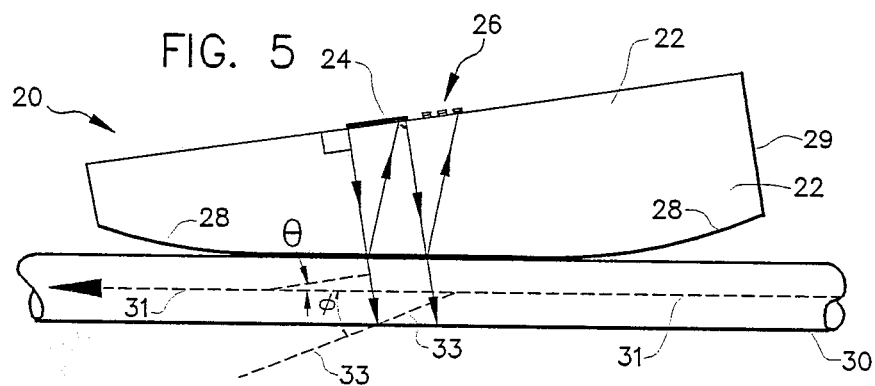
FIG. 5 is a schematic diagram of the embodiment of FIG. 1, illustrating operation with light flow in a second direction through the waveguide.

By reference to FIG. 5 it can also be understood that with no other changes to the embodiment of FIG. 1 except a change in direction of propagation of light in the fiber from right to left, the acoustic wave causes diffraction of light traveling along path 31 to the downwardly directed path 33. Again, the deflection angle between paths 31 and 33 is $\phi$. The illustration of FIG. 5 assumes that the refractive indexes of the fiber 30 matches the adjacent indexes along the path 33 so that the tapped light passes out from fiber 30 in a substantially straight path. In practice, as described above, index matching or a hard contact with a material such as YAG crystal is generally necessary to extract the tapped light from the cladding of the fiber.

Referring again to FIG. 1, it is noted that proper alignment between the fiber 30 and the wedge 22 is important in order to permit the narrow acoustic beam from transducer 24 to intercept the optical path 31 in the core of fiber 30. In order to achieve proper alignment of the devices in this finite region of hard contact, the output transducer 26 is used. Specifically, when the wedge 22 and fiber 30 are not properly aligned, at least a portion of the acoustic signals from transducer 24 are reflected off of the spherical surface 28 at an angle which is detected by the grating output transducer 26. However, when the wedge 22 and fiber 30 are properly aligned, part of the acoustic beam from transducer 24 enters the fiber 30, leaving less power to be reflected to the receiver. Thus, by monitoring the referred power incident upon transducer 26, the spherical surface of wedge 22 may be adjusted on the surface of fiber 30 until the magnitude of the reflected signal detected by transducer 26 is seen to decrease, indicating that acoustic power is being coupled into the fiber. Once so aligned, light tapped out of the fiber 30 can be observed shining through the optical window 29 of the wedge 22.

Because of the low attenuation experienced by the acoustic signal as a result of the proper choice of material for use in wedge 22, the device of FIG. 1 may utilize acoustic waves in the frequency range of above approximately 1 GHz to deflect light by acoustic-optic Bragg interaction. Since the device can be selectively tapped by merely turning the acoustic wave on or off, the device can be utilized for providing tapped optical signals for applications such as signal processing at a very high rate of speed. For example, if reflections in the system are reduced, a tap with a center frequency of 3 GHz will have a bandwidth of over 1 GHz, which implies that tap switching times of less than 1 ns are available. Thus, by application to the transducer 24 of an electrical signal in a manner well-known in the industry, the production of acoustic signals through transducer 24 may be switched at extremely high rates of speed to provide a very fast device for high-speed applications such as signal processing. In addition, the amount of light tapped from the system can also be controlled by simply varying the RF power supplied to the transducer 24.

Going beyond the physical description of the device of FIG. 1 and its operation as presented above, the device may now be described on a mathematical basis. In order to do this, consider a fiber with an acoustic wave incident at an angle $\theta$ to the normal. The acoustic wave has a radian frequency $\omega_s$ and propagation constant $k_s$. An optical beam is traveling within the fiber, and it has a frequency $\omega_1$ and propagation constant $k_1$. The optical beam diffracted by the acoustic wave has a frequency $\omega_2$ and propagation constant $k_2$ and is emitted at an angle $\phi$ to the axis of the fiber. There are two ways in which an optical signal may be deflected in these circumstances. The signal is either upshifted or downshifted in frequency, so that $$\omega_2 = \omega_1 \pm \omega_s \qquad (3)$$

Because $\omega_2 \approx \omega_1$, it follows that as $k_2 = \omega_2/c$ and $k_1 = \omega_1/c$, where c is the wave velocity in the fiber, then $$k_2 = k_1 \qquad (4)$$

Furthermore, it can be shown from conservation of momentum that $$k_2 \cos \phi = k_1 \cos \phi = k_1 \pm k_s \sin \phi \qquad (5)$$

and $$k_2 \sin \phi = k_1 \sin \phi = \pm k_2 \cos \theta \qquad (6)$$

It follows from these relations that $$\phi = 2\theta \qquad (7)$$

There are two possible solutions to the above, one of which is illustrated by the light deflected in the embodiment of FIG. 1. Alternatively, as illustrated in FIG. 5, when the acoustic beam is incident in the opposite direction to the direction of propagation of the optical wave along the fiber, the diffracted optical beam is emitted from the lower side of the fiber, i.e. both $\theta$ and $\phi$ are negative.

The conditions described above hold exactly when the region of interaction in the z direction along the fiber 30 is of length $l \to \infty$, and the region of interaction across the fiber 30, i.e. corresponding to its diameter d, is very large. In this case, there is only one possible acoustic frequency for a given optical frequency, because the condition derived from Equations (5) and (6) must be satisfied, and the beam must enter at this angle $\theta$. This condition is expressed as follows:

$$\sin \theta = \pm \frac{k_s}{2k_1} \qquad (8)$$

More generally, for a thin fiber, the region of interaction across the fiber is only on the order of one or two optical wavelengths wide, while the length of the interaction region along the fiber may be as large as 1 mm, corresponding to several hundred wavelengths. In this case, Equation (4) will still hold, but Equation (5) will not be relevant.

It follows from Equation (4) that the output angle is given by the relation $$\cos \phi = 1 - \frac{k_s \sin \theta}{k_1} \qquad (9)$$

with $$A = A_0 \frac{\sin \frac{k_s - k_{s0}}{2} d \cos \theta}{\frac{k_s - k_{s0}}{2} d \cos \theta} \qquad (10)$$

$$= A_0 \frac{\sin \pi \frac{\omega_s - \omega_{s0}}{\omega_{s0}} \frac{d}{\lambda_{s0}} \cos \theta}{\pi \frac{\omega_s - \omega_{s0}}{\omega_{s0}} \frac{d}{\lambda_{s0}} \cos \theta}$$

where A is the output amplitude of the light. The center frequency is selected to satisfy the Bragg condition defined by Equation (8). Thus, $A_0$ is selected to be the amplitude at the center acoustic frequency; $\omega_{s0}$ for the interaction; $\omega_s$ the acoustic frequency; $K_{s0} = \omega_{s0}/V$ and $K_s = \omega_s/V$; V the acoustic velocity in the fiber; and d the effective diameter of the core. Experimental results given hereafter are for the amplitude in the plane parallel to the incident acoustic beam. This amplitude will, in turn, vary with the angle of the azimuth of the output beam.

In this device, the length of the interaction region between the wedge 22 and the fiber 30 is normally very much larger than the diameter of the fiber. This is very different from typical Bragg cells, wherein the width of the optical beam is often very much larger than the optical beam length in the interaction region. Therefore, the way in which the output varies with frequency depends mainly on the length of the interaction path and the acoustic wavelength.

The spacing of the −3 dB response points is given by the relation $$\frac{\Delta \omega_s}{\omega_{s0}} = \frac{.89 \lambda_{s0}}{d \cos \theta} \qquad (11)$$

For a value of d=4 $\mu$m, and a center frequency of 3 GHz, the acoustic wavelength in quartz is $\lambda_{s0} = 1.7$ $\mu$m. For a He-Ne laser, the optical wavelength in quartz is 0.4 $\mu$m. This implies that at the center frequency, the input angle is $\theta = 6.4°$, and the 3 dB bandwidth is 38% or 1.14 GHz.

1.1. Fabrication of the YAG Wedge Tap.

In fabricating the device of FIG. 1, two zinc oxide acoustic transducers 24 and 26, illustrated schematically in FIG. 2, are deposited on the flat upper face of the wedge 22 using standard RF sputtering and photolithographic techniques. Because these transducers operate some distance away from the core of fiber 30, the acoustic beams suffer considerable diffraction, the extent of which depends on the transducer width, the acoustic wavelength, and the distance to the core. The wedge is made as thin as possible to minimize diffraction, allowing the acoustic transducer to be positioned about 400 μm from the fiber core. For this distance, it is found that a transducer width of about 30 μm will produce the maximum acoustic field in the fiber 30.

As was described above, proper alignment of the wedge 22 relative to the fiber 30 depends on the ability to monitor the acoustic wave reflected back inside the wedge 22. In the illustrated example embodiment, the wedge angle $\theta_r$ is about 12.5°, so the reflected beam hits the upper surface at an incident angle of $\theta_i=25°$. A conventional receiver transducer would be useless because it would only detect acoustic waves arriving at $\theta_i=0°$. However, the problem is solved by making the receiver 26 in the form of a grating, as illustrated in FIGS. 2 and 3. If fingers 27 of the grating have width w and periodic spacing l, the receiver 26 is sensitive at angles given by $$\sin \theta_i = \frac{n\lambda_s}{2l} \quad n = 0, \pm 1, \pm 2, \ldots \quad (12)$$

where $\lambda_s$ is the acoustic wavelength. The design presented in this example uses $\theta_i=25°$, $\lambda_s=3.0$ μm, n=2 to obtain l=14 μm. Using five fingers 27 of width w=7 μm, it is possible to monitor the reflected acoustic beam for purposes of alignment.

Figure 6:
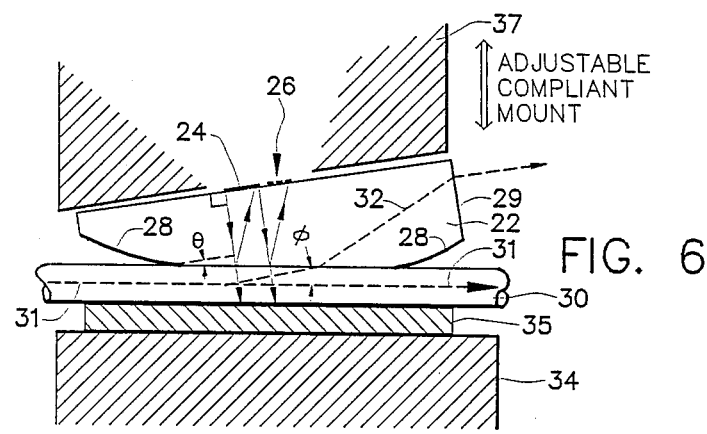
FIG. 6 is a schematic illustration of the device of FIG. 1, showing the method and apparatus for aligning the wedge and the light path.

One method and apparatus for assembling the device may be described with reference to FIG. 6. There, it is seen that the D-fiber 30 is glued to a glass slide 35 with the flat side of the fiber 30 facing up. The slide 35 is then attached to a tilt table 34, allowing the fiber 30 to be oriented to the angle necessary for proper alignment. The YAG wedge 22 is attached to an adjustable compliant mount 37 such as a leaf spring, and microwave cables (not shown) are connected to the transducers 24 and 26 through simple microstrip matching networks. The wedge 22 can be moved in three dimensions by micrometers (not shown) in accomplishing the alignment as described above. Specifically, after a crude alignment by eye, the tilt table 34 and position micrometers are adjusted to make the receiver output decrease, indicating that acoustic power is being coupled into the fiber.

1.2. Summary of Experimental Measurements

Figure 7:
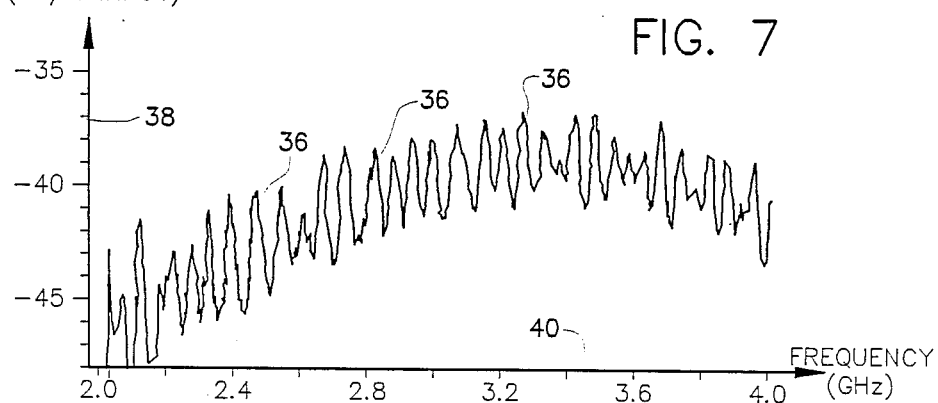
FIG. 7 is a graphical illustration of the measured tap efficiency of the device illustrated in FIG. 1, as a function of RF frequency of an acoustic signal used in that embodiment of the invention.

The above described example system was constructed and tested. In the tests, the light tapped out of fiber 30 was measured over the 2–4 GHz range using a computer-controlled data acquisition system. The efficiency of the Bragg cell tap 20 can be expressed in decibels as $$\eta = 10 \log \frac{\text{tapped optical power}}{\text{untapped optical power}} \quad (13)$$

e.g., $\eta=-30$ dB if 0.1% of the light is tapped out, $\eta=-40$ dB if 0.01% is tapped out, etc. Because the tap efficiency is proportional to the RF input power, $\eta$ is expressed as the efficiency of the tap 20 when 1 watt RF power is used. The resulting units are dB/W input. The measured frequency response is illustrated graphically in FIG. 7. Specifically, the graph of FIG. 7 comprises a plot line 36 defining the tap efficiency shown on the veritcal axis 38 as compared against the frequency shown on the horizontal axis 40. The periodic structure in the plot 36 is caused by acoustic reflections within the fiber 30, and can be smoothed out by acoustically backing the fiber 30 with indium or other similar material to reduce the reflections. As indicated above, when the reflections are reduced, the tap 20 will have a bandwidth of over 1 GHz, implying tap switching times of less than 1 ns. In addition, the efficiency of the tap can be controlled simply by varying the RF power to the transducer.

2. The Interdigital Fiber Tap.

Another preferred embodiment the present invention may be described by reference to FIG. 8. The device of FIG. 8 comprises an interdigital optical fiber tap generally indicated at 50, which includes a grating transducer generally indicated at 52, comprised of a plurality of transducer elements configured as fingers 54 to define a grating surface. Preferably, the fingers 54 are configured as a group of interleaved gratings of conductive metallic composition, such as gold, organized in a phased array. The fingers 54 are deposited on a piezoelectric transducer layer 56 such as ZnO, LiNbO$_3$, or AlN. This transducer layer 56 is itself deposited on a metal film 58 such as gold. The metal film 58 is, in turn, positioned upon a substrate 60 comprising an optical waveguide, such as an optical fiber.

The device of FIG. 8 functions in a manner similar to the wedge configuration of FIG. 1. However, by use of the interdigital transducer 52 positioned upon the surface of the waveguide 60, acoustic losses experienced in the wedge are avoided, and alignment between the waveguide and a wedge is not necessary. If the grating transducer 52 was configured in a conventional manner with a group of parallel fingers, but was deposited directly on the side of the waveguide, acoustic waves could be launched into the waveguide at angles such as those shown in FIG. 4, which illustrates the radiation pattern of a conventional grating transducer. By properly choosing the grating spacing, one of these angles could be made to satisfy the Bragg condition. In that situation, light would be tapped out by the beam at that angle, as well as the corresponding symmetrical beam at the Bragg angle, but acoustic power would be needlessly wasted in the other acoustic beams. This problem can be overcome, and the tap efficiency improved by use of two interleaved gratings operating at a $\pi$ phase shift. These interleaved gratings can comprise a phased array, having a configuration such as the array illustrated in FIG. 9. Specifically, the transducer array illustrated in FIG. 9 comprises one preferred embodiment of the interdigital transducer 52 on the device of FIG. 8, as viewed from the top. Another embodiment would involve applying an appropriate phase delay to each element in the array, thus exciting an acoustic wave at any desired angle. An index matching material will also be necessary to bring the deflected light out of the waveguide.

A radiation pattern representative of the pattern produced by the configuration of transducer 52 illustrated in FIG. 9 is shown in FIG. 10. By selecting the correct finger width w while keeping the period l constant, the two beams at the Bragg angle $\theta_B$ can be made to contain over 90% of the total radiated acoustic power. The finger width w has only a very small influence on the pattern so long as w is less than l. Therefore, for practical purposes any desired width w which is less than l is acceptable. The Bragg condition is satisfied by choosing l so that $$\sin \theta_B = \frac{\lambda}{2\lambda_s} = \frac{\lambda_s}{l} \quad (14)$$

where $\lambda$ is the optical wavelength. For purposes of example, if the acoustic signal is operated at a frequency of 3.2 GHz, $\lambda = 1.86\ \mu m$, then $$l = \frac{2\lambda_s^2}{\lambda} = 16\ \mu m \quad (15)$$

FIG. 11 provides a schematic illustration of the operation of the embodiment of FIG. 8, in the configuration described above and with appropriate finger widths, for tapping of light from a core 62 of a waveguide 60 which comprises an optical fiber. In one preferred embodiment, waveguide 60 comprises a single optical fiber.

The advantage of depositing acoustic transducers directly on an optical fiber may be appreciated by reference to FIG. 12. In this figure, a cross-section of an optical fiber 60 is illustrated, showing the interdigital transducer 52 positioned on the surface of the fiber 60. This transducer 52 defines a curved configuration which produces an acoustic wave over an angular range of approximately 40° within the fiber 60. Because the core 62 is located substantially in the center of the fiber 60, the angular orientation of the transducer 52 causes the acoustic wave excited by the transducer, and which travels in the region indicated at 64, to be focused on the core 62. Thus, the interaction between the acoustic signal and the light in core 62 is much greater than in the wedge system in which the acoustic beam is essentially a parallel one.

This higher amount of interaction increases the efficiency of this Bragg cell tap over the wedge configuration. In fact, it is estimated that the efficiency of this tap is about 7% per watt of input, or $-11$ dB/W input. In addition to this improved efficiency, the deposition of the acoustic transducer directly on the fiber eliminates the need for any mechanical alignment and makes the device very rugged and suitable for field use.

The actual time delay of the acoustic wave is extremely small since the time delay corresponds to a region on the order of the width of the fiber. As a result, acoustic losses can be extremely low, and the device can be utilized at very high acoustic frequencies. Further, the interdigital transducer utilized in this embodiment is coarser than a transducer which may be utilized for a surface acoustic wave, as has been done in some prior art systems. This is because this device utilizes bulk waves which are, in fact, propagating at an angle to the transducer. This results in the periodic spacing of the fingers described above, based upon the longitudinal coustic wavelength in the fiber. This spacing requirement is less severe for the interdigital transducer configurations than other types of acoustic devices which could be utilized to produce acoustic signals at such high frequencies.

2.1. Fabrication of the Interdigital Fiber Tap.

Sputtering thin films onto a fiber to produce acoustic transducers requires special techniques to accommodate the thin and fragile glass fiber. In one preferred method for accomplishing this, small stainless steel bars comprises carriers which support the optical fiber waveguides through the fabrication process. Each carrier is bowed so that its upper or outer surface is rounded to a cylinder radius of approximately 30 cm, and is polished smooth. The cylinder axis defining the bowed carrier is perpendicular to the longitudinal axis of the carrier. Small spring clamps at each end of the carrier hold ends of the fiber so that the fiber extends parallel to the longitudinal axis of the carrier and is secured against the upper rounded surface of the carrier. The carriers are clamped into a thermal mount in an RF sputtering station, and the stiffness of the fibers is used to keep the fibers pressed against the steel carriers, which maintain the fibers at the temperature necessary for sputtering thin films. First a layer of electrically conductive material such as gold is sputtered onto the fiber. Photoresist is then spun onto both the fiber and the carrier, so that the orientation of the fiber does not change between process steps.

A ground plane is next photolithographically defined on the electrically conductive material, after which unwanted conductive material is etched away. A piezoelectrical material such as zinc oxide, is next sputtered onto the fiber, after which photoresist is spun onto the fiber and carrier. A location of an acoustic transducer array is next photolithographically defined on the piezoelectric material using a projection system. The projection aperture is reduced to allow a large depth of focus which is needed to expose the side of a cylindrical fiber.

With the transducer array photolithographically defined, a layer of electrically conductive material such as gold is deposited over the photoresist. The transducer array is then formed using lift-off techniques, after which the optical fiber is dismounted from the carrier.

By a modification to the device illustrated in FIG. 8, a further embodiment of the invention may be produced. Specifically, if the zinc oxide, lithium niobate, or aluminum nitride layer 56 is utilized as the optical waveguide by transmission of light into that layer, then the interaction between the interdigital transducer 52 and the light can be made extremely strong due to the interaction within an acoustic-optic material with a relatively large piezo-optic coefficient. The further reduction in signal attenuation in this configuration provides very large bandwidths and efficiencies which can be even greater than those described above in connection with the other preferred embodiments of the invention.

The various preferred embodiments of the invention disclosed herein find application is optical systems of numerous types. For example, the invention is useful in conjunction with optical systems involving substantially any form of light transmission including, but not limited to, single-mode, multi-mode and birefringent waveguides. The applications of the invention include bulk optics systems as well as fiber-optic systems. Thus, the preferred embodiments described herein comprise examples of how the invention may be used and embodied. However, the scope of the invention is not intended to be limited to those embodiments and applications disclosed herein.

In summary, not only does the invention described herein comprise a significant improvement over the prior art in the Bragg cell technology, but it also overcomes other long existent problems in fiber-optic systems by: (1) providing a means by which optical signals may be taped from or injected into a waveguide at high switching speeds; (2) providing an acoustic path formed entirely of solid material for transmitting acoustic signals from an acoustic signal into an optical waveguide to diffract light from that waveguide; (3) providing an optical tap which utilizes an acoustic signal for causing deflection of light so it may be extracted from a waveguide, and which includes means for easily adjusting the relative orientations of the tap and the waveguide to control and maximize the transmission of acoustic signals into the waveguide; (4) providing an optical tap which applies an acoustical input signal through a transmission device into an optical waveguide causing light to be emitted from the waveguide into the same transmission device for communicating the light to external devices; (5) providing means for applying acoustic signals directly from a transducer into an optical waveguide to define an acoustic path formed entirely of solid materials and to provide improved efficiency in diffracting light signals traveling within the waveguide; (6) providing a means for depositing an acoustic transducer on the surface of an optical fiber so as to focus acoustic signals from the transducer onto the core of the fiber, thereby increasing efficiency of the device in diffracting light signals from the core of the fiber; and (7) providing a means for depositing a transducer directly on the surface of an optical waveguide, and for applying an acoustic signal from the transducer directly into an optical waveguide at an angle necessary to create Bragg scattering within the waveguide, with no need for further mechanical alignment of the means after it is deposited on the surface of the waveguide.

In addition to overcoming these problems, the present invention includes a method for fabricating the improved Bragg cells for use as optical taps or switching devices. This fabrication process comprises a great step forward in the simplification of construction of such devices. Thus, the present invention is economical to produce, in addition to comprising an important improvement in providing efficient and reliable taps and switching devices for use in optical systems.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An acousto-optic device comprising:
   an optical waveguide for propagating light along a first optical path; and
   an acoustic transmission medium having at least a portion of its surface secured in hertzian contact with a portion of the optical waveguide;
   an acoustic transducer secured upon the acoustic transmission medium so as to generate bulk acoustic waves having a frequency of at least about 1 GHz for propagating through an acoustic path extending from said transducer through said acoustic transmission medium to said first optical path, said acoustic path formed entirely of solid material, said acoustic path intersecting said first optical path at an angle selected to cause said light to be deflected from said first optical path along a second optical path.

2. An acousto-optic device as described in claim 1 wherein said acoustic transmission medium comprises a block of material for transmitting acoustic signals therethrough, and wherein the portion of said block to be secured in hertzian contact is substantially arcuate in configuration.

3. An acousto-optic device as described in claim 2 wherein said block comprises a crystalline material and wherein said waveguide comprises an optical fiber.

4. An acousto-optic device comprising:
   an optical fiber for guiding light along an optical path said optical fiber having an outer surface; and
   an acoustic transducer, affixed directly on said outer surface of said optical fiber, so as to extend about only a portion of the circumference of said waveguide, for producing bulk wave acoustic signals having wavefronts, said transducer adapted to direct said wavefronts toward said optical path such that said wavefronts intercept said optical path at a predeermined angle which causes said light to be deflected out of said optical fiber.

5. An acousto-optic device as defined in claim 4 wherein said optical fiber has a core and a cladding, and said surface comprises the outer peripheral surface of said cladding.

6. An acousto-optic device as defined in claim 5 wherein said transducer conforms to a curved surface of said optical fiber to cause said acoustic wavefronts to be focused at said core.

7. An acousto-optic device as defined in claim 4 wherein said transducer comprises a grating transducer and wherein the elements of said grating transducer are spaced to cause said wavefronts to propagate at said predetermined angle.

8. An acousto-optic device for deflecting light traveling in an optical waveguide, comprising:
   an optical waveguide through which light travels;
   an acoustic transmission medium having at least a portion of its surface secured in hertzian contact with a portion of the optical waveguide; and
   a source of acoustic signals secured upon the acoustic transmission medium so as to define an acoustic path formed entirely of solid material for communicating acoustic signals from said source of acoustic signals to light in the optical waveguide, said acoustic path communicating said acoustic signals within the waveguide in a direction which is angularly oriented with respect to a direction of travel of said light such that a portion of said light is deflected to a new direction of travel by said acoustic signals.

9. An acousto-optic device as defined in claim 8 wherein the acoustic transmission medium comprises a crystalline material secured in hertzian contact with the optical waveguide along at least a portion of a substantially arcuate surface of said crystalline material.

10. An acousto-optic device as defined in claim 9 wherein light deflected in a new direction of travel passes from the waveguide into the crystalline material through which it travels to an output port.

11. An acousto-optic device as defined in claim 9 wherein the crystalline material is configured to place the source of acoustic signals in relationship with the waveguide so that the direction of acoustic wave travel is at an angular orientation with respect to the direction of travel of the light necessary to deflect light to the new direction of travel.

12. An acousto-optic device as defined in claim 11, further comprising means secured to the crystalline material for indicating when the relationship between the source of acoustic waves and the waveguide is such that an increased portion of the acoustic waves will pass from the crystalline material into the waveguide.

13. An acousto-optic device as defined in claim 12 wherein the indicating means comprises a grating transducer positioned on the crystalline material and configured to detect acoustic waves reflected from another surface of the crystalline material, and to detect a reduction in the reflected waves indicative that said increased portion of the acoustic waves are passing from the crystalline material into the waveguide.

14. An acousto-optic device as defined in claim 11 wherein the crystalline material permits through transmission of light and produces a low amount of acoustic attenuation, and wherein the crystalline material is substantially wedge-shaped and has a curved surface adjacent the waveguide for adjusting the location of hertzian contact beteen the crystalline material and the waveguide.

15. An acousto-optic device as defined in claim 14 wherein the waveguide comprises an optical fiber having a D-shaped cross-sectional configuration along at least a portion of its length, and wherein the crystalline material is in hertzian contact with a flat region of the D-shaped portion of the optical fiber.

16. An acousto-optic device as defined in claim 14 wherein a portion of a surface of the crystalline material is polished to define an optical window, and wherein light deflected from the waveguide passes through the crystalline material and out of the optical window.

17. An acousto-optic device for deflecting light traveling in an optical waveguide, comprising:
an optical waveguide through which light travels;
a solid acoustic transmission medium secured in hertzian contact with a selected region of the optical waveguide; and
a source of bulk acoustic wave secured to said solid acoustic transmission medium for communicating bulk acoustic waves having a frequency above about 1 CHz through said transmission medium into the optical waveguide along a path of travel formed entirely of solid material, with the acoustic path of travel intersecting a path of travel of said light, causing a portion of said light to be deflected to another direction of travel.

18. An acousto-optic device as defined in claim 17 wherein a portion of the light deflected to another direction of travel passes out of the waveguide and through the transmission medium.

19. An acousto-optic device as defined in claim 17 further comprising a grating transducer secured to the acoustic transmission medium for detecting acoustic waves reflected from the source of acoustic waves within the transmission medium, and for identifying a reduction in the reflected acoustic waves indicating that acoustic waves are passing into the waveguide.

20. An acousto-optic device as defined in claim 17 wherein the source of acoustic waves comprises an acoustic transducer which is electrically excited to produce said acoustic waves for propagation through the transmission medium.

21. An acoustic device for deflecting light traveling in an optical waveguide, comprising:
an optical fiber through which light travels, said optical fiber having a substantially flat surface extending along at least a portion of the length of one side of said fiber;
a block of crystalline material having a portion thereof secured in hertzian contact with a portion of the flat surface of said optical fiber; and
an acoustic transducer secured upon said block of crystalline material so that bulk wave acoustic signals from said transducer are communicated through said block of crystalline material into said optical fiber along a path of travel formed entirely of solid material and which intersects with a path of said light in the fiber, such that said acoustic signal produces diffraction of a portion of the light, and wherein the diffracted light travels in a changed direction.

22. An acousto-optic device as defined in claim 21 wherein the angular relationship between wavefronts of the acoustic signals and the intersected path of light in the fiber satisfies a Bragg condition such that the diffraction of a portion of the light comprises Bragg scattering of light traveling in said intersected path of light.

23. An acousto-optic device for deflecting light traveling in an optical fiber, comprising:
an optical fiber through which light travels, said optical fiber having at least one surface, and
a source of bulk wave acoustic signals secured in contact with a surface of the optical fiber, so as to extend about only a portion of the circumference of said waveguide, for transmitting bulk wave acoustic signals at frequencies of at least about 1 GHz within the optical fiber such that said acoustic signals cause light to be deflected out of said optical fiber.

24. An acousto-optic device as defined in claim 23 wherein the source of acoustic signals is secured upon a surface of the optical fiber so as to conform to the configuration of the surface and communicate acoustic waves into the optical fiber.

25. An acousto-optic device as defined in claim 24 wherein the surface of the optical fiber is curved about an axis of the fiber such that acoustic waves from the source of acoustic signals are directed generally toward said axis of the fiber.

26. An acousto-optic device as defined in claim 23 wherein the source of acoustic signals comprises a grating transducer configured on a surface of the optical fiber to transmit acoustic waves into the waveguide in a direction having an angular orientation to a direction of light traveling in the optical fiber such that said acoustic waves interact with said light and cause said light to be deflected out of the optical fiber.

27. An acousto-optic device as defined in claim 26 wherein the angular orientation between the direction of travel of light in the optical fiber and wavefronts of the acoustic waves interacting with said light satisfies a Bragg condition such that deflection of light out of the optical fiber comprises Bragg scattering of said light traveling in the optical fiber.

28. A method of manufacturing an acousto-optic device for deflecting light in an optical waveguide, comprising the steps of:
securing an acoustic transducer in contact with a surface of an acoustic transmission medium having a curved surface;
securing the curved surface of the acoustic transmission medium in hertzian contact with a surface of an optical waveguide;
exciting the acoustic transducer to produce acoustic waves;
communicating the acoustic waves from the acoustic transducer through an acoustic path formed entirely of solid material, which acoustic path passes through the acoustic transmission medium to the optical waveguide; and adjusting position of the hertzian contact between the acoustic transmission medium and the optical waveguide to increase flow of the acoustic waves into the optical waveguide.

29. A method of manufacturing an acousto-optic device as defined in claim 28 further comprising the step of securing, in contact with the transmission medium, means for detecting acoustic signals reflected from the acoustic transducer in the transmission medium, and wherein the step of adjusting position of the hertzian contact includes the step of monitoring said reflected signals through the detecting means and adjusting position of the hertzian contact until a reduction in the reflected acoustic signals is detected, indicating an increase in acoustic signals passing into the optical waveguide.

30. A method of manufacturing an acousto-optic device as defined in claim 29 wherein the step of securing means for detecting comprises the step of securing a grating transducer to a surface of the transmission medium at a location and in a configuration to detect acoustic signals from the acoustic transducer which are reflected in the transmission medium.

31. A method of manufacturing an acousto-optic device as defined in claim 28 further comprising the step of providing a polished optical window in said transmission medium for transmission of light from said waveguide through said transmission medium to said polished optical window.

32. A method of manufacturing an acousto-optic device for deflecting light in an optical waveguide, comprising the steps of:

providing a carrier bar for securing an optical fiber throughout a fabrication process;

bowing the carrier bar to define a selected carrier radius of an upper surface of the bar about an axis which is perpendicular to a longitudinal axis of the carrier bar;

polishing smooth the upper surface of the carrier bar;

securing an optical fiber against the upper rounded surface of the carrier;

clamping the carrier into a thermal mount in a sputtering station;

maintaining temperature of the fiber throughout its contact with the carrier;

depositing thin films on the optical fiber using sputtering;

defining an array of transducer on the optical fiber using photolithography; and dismounting the optical fiber from the carrier.

33. A method of manufacturing an acousto-optic device as defined in claim 32 wherein the steps of depositing thin films and defining an array of transducer comprise the steps of:

sputtering a layer of electrically conductive material onto the fiber;

spinning photoresist onto the fiber and carrier;

photolithographically defining a ground plane on the electrically conductive material;

etching away unwanted conductive material;

sputtering a piezoelectric material onto the fiber;

spinning photoresist onto the fiber and carrier;

photolithographically defining a location of an acoustic transducer array on the piezoelectric material;

depositing a layer of electrically conductive material over the photoresist; and forming the transducer array using lift-off techniques.

34. A method of manufacturing an acousto-optic device as defined in claim 32, wherein the step of depositing thin films comprises use of RF sputtering.

35. A method of manufacturing an acousto-optic device as defined in claim 32, wherein the step of defining an array of transducers comprises use of projection photolithography.

* * * * *

UNITED STATES PATENT AND TRADEMARK OFFICE
CERTIFICATE OF CORRECTION

PATENT NO. : 4,735,476

DATED : April 5, 1988

INVENTOR(S) : Brian L. Heffner, et al.

It is certified that error appears in the above—identified patent and that said Letters Patent is hereby corrected as shown below:

Column 2, line 15, change the words "does ot" to --does not--

Column 14, line 63, change the word "taped" to --tapped--

Column 17, line 15, change the word "beteen" to --between--

Column 17, line 60, change the word "acoustic" to --acousto-optic--

Signed and Sealed this

Twenty-second Day of November, 1988

Attest:

DONALD J. QUIGG

Attesting Officer

Commissioner of Patents and Trademarks